(12) United States Patent
Ozaki et al.

(10) Patent No.: US 6,589,645 B1
(45) Date of Patent: Jul. 8, 2003

(54) LAMINATED MEMBER AND METHOD FOR MANUFACTURING THE SAME

(75) Inventors: Kazuo Ozaki, Fujinomiya (JP);
Tadahiro Kegasawa, Fujinomiya (JP);
Ryuichi Katsumoto, Fujinomiya (JP);
Takumi Araki, Kawasaki (JP); Toshio Taka, Kawasaki (JP)

(73) Assignees: Fuji Photo Film Co., Ltd., Kanagawa-ken (JP); Japan Polyolefins Co., Ltd., Tokyo (JP)

( * ) Notice: Subject to any disclaimer, the term of this patent is extended or adjusted under 35 U.S.C. 154(b) by 0 days.

(21) Appl. No.: 09/806,336

(22) PCT Filed: Sep. 30, 1999

(86) PCT No.: PCT/JP99/05393
§ 371 (c)(1),
(2), (4) Date: Mar. 29, 2001

(87) PCT Pub. No.: WO00/18578
PCT Pub. Date: Apr. 6, 2000

(30) Foreign Application Priority Data

Sep. 30, 1998 (JP) ............................. 10-279200

(51) Int. Cl.⁷ .................. B32B 27/32; B29C 47/06; C08L 23/04
(52) U.S. Cl. ............ 428/316; 136/244.17; 136/244.23; 136/244.27; 136/272.8; 136/308.2; 428/519; 428/521; 428/523
(58) Field of Search ................. 428/516, 519, 428/521, 523; 156/244.17, 244.27, 244.23, 272.8, 308.2

(56) References Cited

U.S. PATENT DOCUMENTS 5,223,311 A  6/1993  Tsutsumi et al. ......... 427/388.1
6,099,685 A  8/2000  Ito et al. ..................... 156/330

FOREIGN PATENT DOCUMENTS

| EP | 0 113 955 A1 | 7/1984 | .......... C09D/3/733 |
| EP | 0 399 439 A2 | 11/1990 | .......... B32B/27/00 |
| EP | 0 662 633 A1 | 12/1995 | |
| EP | 1 020 480 A1 | 7/2000 | |
| JP | 57-157724 | 9/1982 | ............ B29D/9/00 |
| JP | 58-191128 | 11/1983 | ............ B29D/9/00 |
| JP | 59-100150 | 6/1984 | ............ C08L/23/04 |
| JP | 63-288729 | 11/1988 | ............ B29C/47/04 |
| JP | 64-36441 | 2/1989 | ............ B32B/15/08 |
| JP | 2-305637 | 12/1990 | ............ B32B/27/32 |
| JP | 3-79685 | 4/1991 | ............... C09J/7/02 |
| JP | 5-104694 | 4/1993 | ............ B32B/31/30 |
| JP | 7-157604 | 6/1995 | ............ C08L/23/04 |
| WO | WO 99/16796 | 8/1999 | |

*Primary Examiner*—D. S. Nakarani
(74) *Attorney, Agent, or Firm*—Sughrue Mion, PLLC

(57) ABSTRACT

The present invention relates to a laminated member comprising a polyethylene resin composition layer having a very high adhesive strength to a substrate, and a method for manufacturing the same. The present invention is directed to a method for manufacturing the laminated member, which has a high adhesive strength to a different kind of substrate within a range from low to high temperature, and can reduce the resin temperature during the extrusion-lamination molding and inhibit any noxious influence on the working and surrounding environments, and is also superior in terms of high-speed mold ability at low temperature, and the laminated member. In the present invention, a compound having a specific structure is incorporated into a polyethylene resin composition layer. The present invention can be used to particular advantage in laminate products such as packaging material.

13 Claims, 1 Drawing Sheet

LAMINATED MEMBER AND METHOD FOR MANUFACTURING THE SAME

TECHNICAL FIELD

The present invention relates to a laminated member comprising a polyethylene resin composition layer having a very high adhesive strength to a substrate, and a method for manufacturing the same. More particularly, the present invention can provide a laminated member having a high adhesive strength without using an anchor-coating agent by using a specific polyethylene resin composition having excellent physical properties such as adhesion properties, and process ability. The present invention also relates to a method for manufacturing the laminated member, which is capable of high-speed molding at low temperature because the polarity of the surface to be treated can be remarkably enhanced by using such a specific polyethylene in combination with an ozone treatment and/or a corona discharge treatment in a extrusion-lamination molding method.

This application is based on the patent application (Japanese Patent Application No. Hei 10-279200) filed in Japan, the disclosure of which is incorporated in part into the present application.

BACKGROUND ART

It has hitherto been performed that polyethylene polymers such as polyethylene and ethylene-vinyl acetate copolymer are extrusion-laminated on substrates such as various films made of plastics (e.g. polypropylene, polyamide, polyester, and saponified ethylene-vinyl acetate copolymer), aluminum foil, Cellophane, and paper, thereby to provide the resulting laminate products with heat-sealing properties and moisture resistance. A large amount of these laminate products are used generally as packaging materials.

In extrusion-lamination molding, polyethylene polymers must possess high adhesion properties to various substrates, as a routine requirement. However, an ethylene polymer is essentially inferior in adhesion properties to the polar substrates described above because it is a non-polar resin. Therefore, when a low-density polyethylene formed according to a high-pressure radical polymerization method (hereinafter abbreviated to "LDPE") is extrusion-laminated on the substrate, the adhesion properties to the substrate are improved by usually setting the resin temperature to a high temperature of 310° C. or higher, thereby oxidizing the surface of a thin melt resin film extruded from an extruder. However, oxidative aging of LDPE is caused by raising the resin temperature to 310° C. or higher, as described above. As a result, the influence of a high degree of fumes causes a deleterious change in the working and surrounding environments. Other problems also arise such as deterioration of the quality of laminate products due to oxidation at high temperature, odor, and high cost of producing heat-seal layer. In addition, when molding is performed at high speed to improve productivity, the adhesive strength is lowered.

In the case of an ethylene-vinyl acetate copolymer, when the extrusion resin temperature is raised to 280° C. or higher, the ethylene-vinyl acetate copolymer decomposes in an extruder or a die causing a strong acetic acid odor and bubble formation. Therefore, it is necessary to extrude the resin at a temperature of 260° C. or lower.

However, in the case of such a low temperature, the resulting adhesive strength to the substrate is not sufficient to make it suitable for practical use. To cope with such a problem, a method has been used, wherein LDPE is previously extrusion-laminated on a substrate at high temperature of 310° C. or higher and an ethylene-vinyl acetate copolymer is extrusion-laminated on the surface of LDPE at the same temperature as described above. Therefore, there have been problems such as complicated processes and economical disadvantages.

Japanese Patent Application, First Publication No. Sho 57-157724 discloses a method for extruding an polyethylene resin at low temperature within a range from 150 to 290° C. and subjecting it to ozone treatment, and pressure-laminating the polyethylene resin on a substrate, wherein the surface to be treated has been subjected to an anchor-coating treatment.

When the molding temperature is lowered like this method, fumes and odor are reduced, thereby solving these problems. However, large problems related to productivity and economical efficiency still remain, for example, the adhesive strength is lowered because the molding temperature is lowered, and it is difficult to increase molding speed and reduce the thickness.

When the resin temperature is raised to solve the problems described above, concomitant problems also arise such as exacerbating the influence of fumes on the working and surrounding environments, and deterioration in the odor of products due to oxidative aging at high temperature.

Since high-speed mold ability is now required, the resin temperature must be raised even further to increase the molding speed while still securing high adhesion properties, and, as a result, the problems described above become serious. In addition, even when using the ozone treatment to achieve high-speed molding, it has been difficult to obtain sufficient adhesion properties.

DISCLOSURE OF INVENTION

The present invention has been made to solve the problems described above and provides a method for manufacturing a laminated member, which can maintain adhesive strength to a different kind of a substrate within a range from low temperature to high temperature by using a specific polyethylene resin composition, which can reduce the resin temperature during the extrusion-lamination molding process and can inhibit noxious influences such as fumes and odor on the working and surrounding environments particularly by using said specific polyethylene resin composition in combination with an ozone treatment, and which also can improve the high-speed mold ability without raising the resin temperature, though it is capable of molding at a molding temperature within a range from 200 to 300° C. (wide range from low temperature to high temperature), and the laminated member.

The present inventors have conducted intensive studies to solve the problems described above. As a result, they have found that the problems described above can be solved by incorporating a specific amount of a compound having a specific structure into a general polyethylene resin, thus completing the present invention.

That is, the laminated member of the present invention is a laminated member comprising a substrate and a layer formed on at least one surface of said substrate, said layer being made of a polyethylene resin composition containing a polyethylene resin (A) and a compound having intramolecular unsaturated bonds (B), the number of intramolecular unsaturated bonds in said polyethylene resin composition being not less than 0.5 per $10^3$ carbon atoms.

The polyethylene resin composition preferably contains 99.9 to 50% by weight of the polyethylene resin (A) and 0.1 to 50% by weight of the compound having intramolecular unsaturated bonds (B). In the compound having intramolecular unsaturated bonds (B), the number of intramolecular unsaturated bonds is preferably within a range from 0.5 to 250 per $10^3$ carbon atoms.

The compound having intramolecular unsaturated bonds (B) is preferably at least one selected from polybutadiene, ethylene-propylene-diene terpolymer (EPDM) and polyisoprene. Among these compounds, 1,2-polybutadiene is particularly preferred.

The method for manufacturing a laminated member of the present invention comprises the step of laminating and adhering these polyethylene resin compositions on at least one surface of a substrate by extrusion-lamination method.

In that case, the polyethylene resin composition film subjected to an ozone treatment and the substrate subjected to a corona discharge treatment are preferably laminated and adhered through the surface-treated surface.

Molding can be performed at a molding temperature within a wide range from low temperature to high temperature, e.g. 300° C. or lower, and preferably from 200 to 300° C. High-speed molding can be performed even within a low temperature range (from 230 to 270° C.).

BEST MODE FOR CARRYING OUT THE INVENTION

Figure 1:
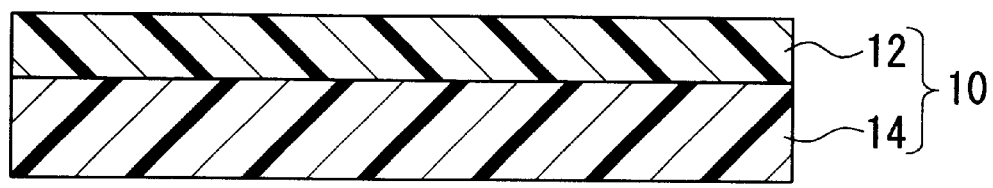
FIG. 1 is a cross-sectional view showing an example of the laminated member of the present invention.

The laminated member of the present invention is a laminated member comprising at least a specific polyethylene resin composition layer and a substrate.

The polyethylene resin composition layer is made of a polyethylene resin composition comprising the following component (A) and component (B).

The component (A) is a polyethylene resin and specific examples include low-density polyethylene (LDPE) obtained by high-pressure radical polymerization, ethylene·vinyl ester copolymer, and copolymer of ethylene ·α, β-unsaturated carboxylic acid or its derivative. The other polyethylene resins include, for example, ethylene homopolymer having a density within a range from 0.86 to 0.98 g/cm³ or copolymer of ethylene and α-olefin having 3 to 20 carbon atoms, which is obtained by low, medium or high pressure polymerization using a Ziegler catalyst, Philips catalyst or metallocene catalyst.

The low-density polyethylene (LDPE) has a density within a range from 0.91 to 0.94 g/cm³, preferably from 0.912 to 0.935 g/cm³, and more preferably from 0.912 to 0.930 g/cm³. The melt-flow rate (MFR) is within a range from 0.001 to 1000 g/10 minutes, preferably from 0.1 to 100 g/10 minutes, and more preferably from 1.0 to 70 g/10 minutes.

The melt tension is preferably within a range from 1.5 to 25 g, and more preferably from 3 to 20 g.

Mw/Mn is preferably selected from within a range from 3.0 to 10, and more preferably from 4.0 to 8.0.

The ethylene·vinyl ester copolymer in the present invention is a copolymer made of ethylene as a principal component, and a vinyl ester monomer such as vinyl propionate, vinyl acetate, vinyl caproate, vinyl caprylate, vinyl laurate, vinyl stearate, or vinyl trifluoroacetate. Among these vinyl ester monomers, vinyl acetate (EVA) is particularly preferred. That is, a copolymer comprising 50 to 99.5% by weight of ethylene, 0.5 to 50% by weight of a vinyl ester and 0 to 49.5% by weight of the other copolymerizable unsaturated monomer is preferred. The content of vinyl ester is preferably within a range from 3 to 20% by weight, and more preferably from 5 to 15% by weight.

Typical copolymers of the copolymer of ethylene·α, β-unsaturated carboxylic acid or its derivative include, for example, ethylene-(meth)acrylic acid or its alkyl ester copolymer, and metallic salts thereof. Examples of the comonomer thereof include acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, glycidyl acrylate, and glycidyl methacrylate. Among these comonomers, particularly preferred are alkyl esters, such as methyl (meth)acrylate, or ethyl (meth)acrylate (EEA). The content of (meth)acrylate ester is preferably within a range from 3 to 20% by weight, and more preferably from 5 to 15% by weight.

Since the aforementioned copolymers of ethylene and a polar group-containing monomer have comparatively low melting points, a laminated member prepared by previously coating a substrate with LDPE is used in the prior art. In the present invention, it becomes possible to directly laminate on the substrate.

The high pressure radical polymerization method described above is a method for polymerizing under pressure within a range from 500 to 3500 kg/cm²G at a polymerization temperature within a range from 100 to 400° C. in the presence of a free radical initiator such as organic or inorganic peroxide, using a tubular reactor or an autoclave reactor.

The other polyethylene resins include, for example, ethylene homopolymer having a density within a range from 0.86 to 0.98 g/cm³ or copolymer of ethylene and α-olefin having 3 to 20 carbon atoms, which are obtained by low, medium or high pressure polymerization using a Ziegler catalyst, Philips catalyst or metallocene catalyst. Examples of the ethylene-α-olefin copolymer include ethylene polymers such as very low-density polyethylene having a density of not less than 0.86 g/cm³ and less than 0.91 g/cm³, linear low-density polyethylene (LLDPE) having a density of not less than 0.91 g/cm³ and less than 0.94 g/cm³, and medium- or high-density polyethylene having a density of not less than 0.94 g/cm³.

Specific examples of the α-olefin having 3 to 20 carbon atoms include propylene, 1-butene, 4-methyl-1-pentene, 1-hexene, 1-octene, 1-decene, and 1-dodecene.

The component (A) of the present invention can contain both a non-polar polyethylene resin and an ethylene copolymer having a polar group such as ethylene-vinyl acetate copolymer or ethylene-ethyl acrylate copolymer, depending on the purpose. Herein, the content of the ethylene copolymer having a polar group is preferably less than 50% by weight, and more preferably less than 30% by weight.

The component (A) of the present invention preferably has a melt-flow rate (under a load of 2.16 kg) within a range from 0.001 to 1000 g/10 minutes, more preferably from 0.1 to 100 g/10 minutes, and still more preferably from 1.0 to 70 g/10 minutes.

When the melt-flow rate is too low or too high, the moldability is poor. When the melt-flow rate is too high, the strength of the product is low.

The component (B) in the polyethylene resin composition of the present invention is a compound having intramolecular unsaturated bonds.

It is necessary that the number of intramolecular unsaturated bonds in the whole polyethylene resin composition is not less than 0.5 per $10^3$ carbon atoms. When the number of intramolecular unsaturated bonds is less than 0.5, the effect on improving the adhesion properties is small.

Specific examples of the compound as the component (B) include compounds having plural unsaturated bonds in a molecule such as at least one compound, oligomer or polymer selected from polybutadiene (preferably 1,2-polybutadiene), polyisoprene, natural rubber, ethylene-propylene-diene terpolymer, ethylene-allyl (meth)acrylate, ethylene-vinyl (meth)acrylate, and the like.

Among these compounds, preferred are 1,2-polybutadiene, ethylene-propylene-diene terpolymer (EPDM) and polyisoprene (particularly 1,2-polybutadiene) in view of improvements in adhesive strength, handling, and workability. These compounds can be used alone or in combination.

The compound as the component (B) preferably has a melt-flow rate (under a load of 2.16 kg) within a range from 0.001 to 1000 g/10 minutes, more preferably from 0.1 to 100 g/10 minutes, and still more preferably from 1.0 to 70 g/10 minutes. When the melt-flow rate is too low or too high, the mold ability is poor. When the melt-flow rate is too high, the strength of the product is low.

The number of intramolecular unsaturated bonds in the compound as the component (B) is preferably within a range from 0.5 to 250 per $10^3$ carbon atoms, more preferably from 5 to 250 per $10^3$ carbon atoms, and still more preferably from 50 to 250 per $10^3$ carbon atoms. When the number of intramolecular unsaturated bonds is too small, the effect on improving the adhesion properties is small. On the other hand, when the number of intramolecular unsaturated bonds is too large, heat stability is likely to be lowered.

It is preferred that 99.9 to 50% by weight of the component (A) and 0.1 to 50% by weight of the component (B) are incorporated into the polyethylene resin composition of the present invention. The content of the component (A) is more preferably within a range from 99.5 to 60% by weight, and still more preferably from 99.0 to 70% by weight, while the content of the component (B) is more preferably within a range from 0.5 to 40% by weight, and still more preferably from 1.0 to 30% by weight. When the content of the component (B) is too small (the content of the component (A) is too large), the adhesion properties are not be exhibited. On the other hand, when the content of the component (B) is too large (the content of the component (A) is too small), heat resistance during mixing process or molding process is likely to be lowered.

The polyethylene resin composition of the present invention preferably has a melt-flow rate (under a load of 2.16 kg) within a range from 0.001 to 1000 g/10 minutes, more preferably from 0.1 to 100 g/10 minutes, and still more preferably from 1.0 to 70 g/10 minutes. When the melt-flow rate is too low or too high, mold ability is poor. When the melt-flow rate is too high, the strength of the product is low.

The polyethylene resin composition can be obtained by blending using a conventional mixing operation, for example, tumbler mixer method, Henschel mixer method, Banbury mixer method, or extrusion-granulation method.

Conventional additives such as other resins, rubbers, pigments, dyes, antioxidants, ultraviolet absorbents, antistatic agents, lubricants, fatty acid metal salts, acid absorbents, cross-linking agents, and foaming agents can be incorporated unless departing from the object of the present invention.

Inorganic and/or organic fillers can be added to the polyethylene resin composition of the present invention in an amount of not more than 100 parts by weight, and preferably within a range from 5 to 100 parts by weight, based on 100 parts by weight of the polyethylene resin composition.

As the filler, inorganic and organic fillers can be used, for example, metal carbonates such as calcium carbonate and magnesium carbonate; metal hydroxides; metal oxides such as titanium oxide and zinc oxide; silica; and talc. Examples of pigments include blue pigments such as Cobalt Blue, Ultramarine Blue, Cerulean Blue, and Phthalocyanine Blue; and magenta pigments such as Cobalt Violet, Fast Violet, and Manganese Violet.

The laminated member of the present invention is a laminated member obtained by laminating and adhering the above polyethylene resin composition layer (LDPE composition layer) on at least one surface of a substrate. For example, as shown in FIG. 1, it is a laminated member 10 in which a polyethylene resin composition layer 12 is formed on one surface of a substrate 14.

The substrate used in the present invention includes a film or a sheet (hereinafter referred to as a sheet), a plate-like material, and the like. For example, there can be used film or sheet (including processed film or sheet, such as oriented one, printed one, metal-evaporated one) made of plastics (e.g. polypropylene, polyamide, polyester, or saponified ethylene-vinyl acetate copolymer), metal foil or metal plate made of aluminum, iron, copper or an alloy containing them as a principal component, Cellophane, paper, woven fabric, or non-woven fabric.

Specific examples of the laminated member include LDPE composition layer/paper layer, LDPE composition layer/paper layer/LDPE composition layer, LDPE composition layer/OPP layer, LDPE composition layer/OPP layer/LDPE composition layer, LDPE composition layer/PA layer, LDPE composition layer/PA layer/LDPE composition layer, LDPE composition layer/ONY layer, LDPE composition layer/ONY layer/LDPE composition layer, LDPE composition layer/PEs layer, LDPE composition layer/PEs layer/LDPE composition layer, LDPE composition layer/OPEs layer, LDPE composition layer/OPEs layer/LDPE composition layer, LDPE composition layer/EVOH layer, LDPE composition layer/EVOH layer/LDPE composition layer, LDPE composition layer/non-woven fabric layer, LDPE composition layer/Al foil layer, and the like.

(Provided that OPP: bi-axially oriented polypropylene, PA: polyamide, ONY: bi-axially oriented polyamide, PEs: polyester, OPES: bi-axially oriented polyester, EVOH: saponified ethylene-vinyl acetate copolymer, Al foil: aluminum foil, HDPE: high-density polyethylene).

According to the method for manufacturing the laminated member by lamination molding according to the present invention, a laminated member can be obtained without lowering the adhesive strength and without using an anchor-coating agent even if high-speed molding is performed at low temperature, by laminating and adhering the resin composition of the present invention on at least one surface of a substrate using extrusion-lamination method, or by subjecting the substrate and/or the resin composition film to a surface treatment and then adhering them through the surface-treated surface.

As used herein, the term "high-speed molding at low temperature" refers to molding performed at a molding temperature of 300° C. or lower at a molding speed not less than 200 m/minute. According to the present invention, it is made possible to exert such a remarkable effect that the adhesive strength is not lowered when performing "high-speed molding at low temperature" at a molding temperature within a range from 200 to 300° C., particularly from 230 to 270° C., at a molding speed not less than 200 m/minute.

As the surface treatment, a general surface treatment can be used, for example, corona discharge treatment, ozone treatment or flame treatment. Preferably, more effective results can be obtained by employing the ozone treatment. More preferably, the polyethylene resin composition film subjected to the ozone treatment and the substrate subjected to the corona discharge treatment are preferably laminated and adhered through the surface-treated surface. Particularly, a melt film of the polyethylene resin composition is preferably subjected to the ozone treatment.

The amount of the ozone treatment varies depending on the kind of substrate and conditions, but is selected within a range from 5 to 1000 g/hour, and preferably from 100 to 500 g/hour. The amount of the corona discharge treatment is selected within a range from 1 to 300 W·minute/m$^2$, and preferably from 10 to 100 W·minute/m$^2$.

The adhesive strength can be maintained at low temperature and high speed by using the ozone treatment in combination with the corona discharge treatment, that is, by laminating and adhering a film made of the polyethylene resin composition subjected to the ozone treatment and the substrate subjected to the corona discharge treatment through the surface-treated surface.

Specifically, while maintaining the temperature of a melt resin film made of the polyethylene resin composition within a range from the melting point to 300° C. during extrusion-lamination, at least one surface of the melt resin film is subjected to the ozone treatment and, immediately after subjecting the substrate to the corona discharge treatment, both are laminated and adhered through the surface-treated surface of the melt resin film and the substrate. Performing all above operations in a single process as described above is preferable, because the adhesive strength, workability, economical efficiency, and the like can be effectively satisfied.

As used herein, the term "in a single process" means an in-line process and the term "immediately after subjecting the substrate to the corona discharge treatment" includes a continuous processing in the aforementioned single process and also immediately after a batch processing.

The method for manufacturing the laminated member by extrusion-lamination molding of the present invention is effective not only in the case a single layer made of the polyethylene resin composition is extrusion-laminated on at least one surface of the substrate, but also in the case two or more polyethylene resin compositions are extrusion-laminated, or in the case two or more layers are extrusion-laminated on one surface of the substrate using the other resin as the outside of the polyethylene resin composition, or in the case the polyethylene resin composition is extrusion-laminated on both surfaces of the substrate.

In the extrusion-lamination molding method of the present invention, an anchor-coating agent is not required essentially between the substrate and the polyethylene resin composition, but an adhesive agent or an anchor-coating agent is not particularly excluded.

As the apparatus for extrusion-lamination molding, a T-die type apparatus can be commonly used. The thickness of the laminated layer is not specifically limited and is appropriately selected.

EXAMPLES

The following Examples further illustrate the present invention in detail, but the present invention is not limited by the Examples.

Example 1

A polyethylene resin composition, wherein the content of a low-density polyethylene resin (LD (I)) having melt-flow rate at 190° C. of 20 g/10 minute and a density of 0.918 g/cm$^3$ is 97.5% by weight and the content of an ethylene-propylene-diene terpolymer (EPDM) having MFR at 230° C. of 3.0 g/10 minutes is 2.5% by weight, was prepared.

The number of intramolecular unsaturated bonds per 10$^3$ carbon atoms in the resulting polyethylene resin composition was measured by the infrared analysis method (IR).

Using a lamination-molding apparatus having a width of 1100 mm and equipped with a 90 mm extruder, the polyethylene resin composition was laminated on a Kraft paper under the conditions shown in Table 1 to produce a laminated member.

The amount of fumes generated during the production as well as the inter-layer adhesive strength and odor with respect to the resulting laminated member were evaluated. The evaluation results are shown in Table 1.

Example 2

A polyethylene resin composition, wherein the content of the low-density polyethylene resin (I) in Example 1 is 97.5% by weight and the content of a 1,2-polybutadiene resin having MFR at 150° C. of 3.0 g/10 minutes is 2.5% by weight, was prepared.

Using a lamination-molding apparatus having a width of 1100 mm and equipped with a 90 mm extruder, the resulting polyethylene resin composition was laminated on a Kraft paper under the conditions shown in Table 1 to produce a laminated member.

The amount of fumes generated during the production as well as the inter-layer adhesive strength and odor with respect to the resulting laminated member were evaluated. The evaluation results are shown in Table 1.

Example 3

A polyethylene resin composition, wherein the content of the low-density polyethylene resin (I) in Example 1 is 99.0% by weight and the content of a 1,2-polybutadiene resin having MFR at 150° C. of 3.0 g/10 minutes is 1.0% by weight, was prepared.

Using a lamination-molding apparatus having a width of 1100 mm and equipped with a 90 mm extruder, the resulting polyethylene resin composition was laminated on a Kraft paper under the conditions shown in Table 1 to produce a laminated member.

The amount of fumes generated during the production as well as the inter-layer adhesive strength and odor with respect to the resulting laminated member were evaluated. The evaluation results are shown in Table 1.

Example 4

7% by weight of the same 1,2-polybutadiene resin as in Example 2 was mixed with 93% by weight of a mixed resin (mixed PE) comprising 40% by weight of the low-density polyethylene resin (I) and 60% by weight of a high-density polyethylene resin having a melt flow of 20 g/10 minutes and a density of 0.963 g/cm³, and the evaluation was performed in the same manner as in Example 2. The results are shown in Table 1.

Example 5

A polyethylene resin composition, wherein the content of the low-density polyethylene resin (I) in Example 1 is 87.429% by weight, the content of titanium dioxide is 10% by weight, the content of Ultramarine Blue is 0.07% by weight, the content of a fluorescent brightener is 0.001% by weight and the content of a 1,2-polybutadiene resin having MFR at 150° C. of 3.0 g/10 minutes is 2.5% by weight, was prepared.

Using a lamination-molding apparatus having a width of 1100 mm and equipped with a 90 mm extruder, the resulting polyethylene resin composition was laminated on a Kraft paper under the conditions shown in Table 1 to produce a laminated member. The evaluation results are shown in Table 1.

Example 6

A polyethylene resin composition, wherein the content of the low-density polyethylene resin (I) in Example 1 is 95.0% by weight and the content of a 1,2-polybutadiene resin having MFR at 150° C. of 3.0 g10 minutes is 5.0% by weight, was prepared.

Using a lamination-molding apparatus having a width of 1100 mm and equipped with a 90 mm extruder, the resulting polyethylene resin composition was laminated on an aluminum foil under the conditions shown in Table 2 to produce a laminated member.

The amount of fumes generated during the production as well as the inter-layer adhesive strength and odor with respect to the resulting laminated member were evaluated. The evaluation results are shown in Table 2.

Example 7

A polyethylene resin composition, wherein the content of the low-density polyethylene resin (I) in Example 1 is 99.0% by weight and the content of a 1,2-polybutadiene resin having MFR at 150° C. of 3.0 g/10 minutes is 1.0% by weight, was prepared.

Using a lamination-molding apparatus having a width of 1100 mm and equipped with a 90 mm extruder, the resulting polyethylene resin composition was laminated on an aluminum foil under the conditions shown in Table 2 to produce a laminated member.

The amount of fumes generated during the production as well as the inter-layer adhesive strength and odor with respect to the resulting laminated member were evaluated. The evaluation results are shown in Table 2.

Example 8

A polyethylene resin composition, wherein the content of the low-density polyethylene resin (I) in Example 1 is 95% by weight and the content of a 1,2-polybutadiene resin having MFR at 150° C. of 3.0 g/10 minutes is 5.0% by weight, was prepared.

Using a lamination-molding apparatus having a width of 1100 mm and equipped with a 90 mm extruder, the resulting polyethylene resin composition was laminated on a nylon film under the conditions shown in Table 3 to produce a laminated member.

The amount of fumes generated during the production as well as the inter-layer adhesive strength and odor with respect to the resulting laminated member were evaluated. The evaluation results are shown in Table 3.

Example 9

A polyethylene resin composition, wherein the content of the low-density polyethylene resin (I) in Example 1 is 99.0% by weight and the content of a 1,2-polybutadiene resin having MFR at 150° C. of 3.0 g/10 minutes is 1.0% by weight, was prepared.

Using a lamination-molding apparatus having a width of 1100 mm and equipped with a 90 mm extruder, the resulting polyethylene resin composition was laminated on a nylon film under the conditions shown in Table 3 to produce a laminated member.

The amount of fumes generated during the production as well as the inter-layer adhesive strength and odor with respect to the resulting laminated member were evaluated. The evaluation results are shown in Table 3.

Example 10

5% by weight of a 1,2-polybutadiene resin was mixed with 95% by weight of a mixed resin (mixed PE) comprising 30% by weight of a low-density polyethylene resin having a melt-flow rate of 6 g/10 minutes and a density of 0.918 9/cm and 70% by weight of a linear low-density polyethylene resin having a melt flow of 13 g/10 minutes and a density of 0.910 g/cm³, and the evaluation was performed in the same manner as in Example 8. The results are shown in Table 3.

Comparative Examples 1, 4 and 7

Using a lamination-molding apparatus having a width of 1100 mm and equipped with a 90 mm extruder, only the low-density polyethylene resin (I) in Example 1 was laminated on a Kraft paper under the conditions shown in Table 1 (Comparative Example 1), laminated on an aluminum foil under the conditions shown in Table 2 (Comparative Example 4), or laminated on a nylon film under the conditions shown in Table 3 (Comparative Example 7) to produce laminated members, respectively.

The amount of fumes generated during the production as well as the inter-layer adhesive strength and odor with respect to the resulting laminated member were evaluated. The evaluation results are shown in Tables 1, 2 and 3.

Comparative Examples 2, 5 and 8

A polyethylene resin composition, wherein the content of the low-density polyethylene resin (I) in Example 1 is 99.95% by weight and the content of the 1,2-polybutadiene resin in Example 2 is 0.05% by weight, was prepared.

Using a lamination-molding apparatus having a width of 1100 mm and equipped with a 90 mm extruder, the resulting polyethylene resin composition was laminated on a Kraft paper under the conditions shown in Table 1 (Comparative Example 2), laminated on an aluminum foil under the conditions shown in Table 2 (Comparative Example 5), or laminated on a nylon film under the conditions shown in Table 3 (Comparative Example 8) to produce laminated members, respectively.

The amount of fumes generated during the production as well as the inter-layer adhesive strength and odor with respect to the resulting laminated member were evaluated. The evaluation results are shown in Table 1, 2 and 3.

Comparative Examples 3, 6 and 9

Using a lamination-molding apparatus having a width of 1100 mm and equipped with a 90 mm extruder, only a low-density polyethylene resin (LD(II)) having a melt-flow rate at 190° C. of 8.2 g/10 minutes was laminated on a Kraft paper under the conditions shown in Table 1 (Comparative Example 3), laminated on an aluminum foil under the conditions shown in Table 2 (Comparative Example 6), or laminated on a nylon film under the conditions shown in Table 3 (Comparative Example 9) to produce laminated members, respectively.

The amount of fumes generated during the production as well as the inter-layer adhesive strength and odor with respect to the resulting laminated member were evaluated. The evaluation results are shown in Tables 1, 2 and 3.

[Evaluation method]

(Adhesive strength to paper)

The adhesive strength to a substrate made of a Kraft paper was evaluated from the situation when an inter-layer peeling operation was performed in accordance with the following three-rank evaluation criteria.

⊚: paper and polyethylene are firmly integrated, no threading of resin

Δ: peelable by excess peeling force

X : easily peeled (Adhesive strength to aluminum foil or nylon film)

The adhesive strength to a substrate made of an aluminum foil (or a nylon film) was measured as follows. That is, the extrusion laminated product was cut into pieces of 15 mm in width and the peel force between the substrate and laminated film was determined by 80 degree peeling at a peeling speed of 300 mm/minute using a universal tensile testing machine (manufactured by Orientec Co., Ltd.).

(Odor)

Using panelists, the evaluation was performed by a sensory test in accordance with the following three-rank evaluation criteria.

A: Nearly odorless.

B: A weak odor was detected.

C: A strong odor was detected.

(Fumes)

a: No fumes were observed.

b: A small amount of fumes were observed.

c: A large amount of fumes were observed.

TABLE 1

| | Examples | | | | | Comp. Examples | | |
|---|---|---|---|---|---|---|---|---|
| | 1 | 2 | 3 | 4 | 5 | 1 | 2 | 3 |
| Component (A) | LD(I) | | | LD/HD | LD(I) | LD(I) | LD(I) | LD(II) |
| MFR of component (A) (190° C.)(g/10 min.) | 20 | | | 10 | 20 | 20 | 20 | 8.2 |
| Component (B) | EPDM | | | 1,2-polybutadiene | | — | 1,2-polybutadiene | — |
| MFR of component (B) (g/10 min.) | 3.0 (230° C.) | | | 3.0 (150° C.) | | — | 3.0 (150° C.) | — |
| No. of intramolecular unsaturated bonds of (B) (per 1000 carbon atoms) | 70 | | | 250 | | — | 250 | — |
| Content of component (B) (%) | 2.5 | 2.5 | 1.0 | 7.0 | 2.5 | 0 | 0.05 | 0 |
| No. of intramolecular unsaturated bonds in composition (per 1000 carbon atoms) | 1.9 | 6.3 | 2.6 | 17.5 | 6.3 | 0 | 0.13 | 0 |
| Substrate | Kraft paper | | | | | Kraft paper | | |
| Molding temperature (° C.) | 250 | | | 270 | 250 | 250 | 250 | 320 |
| Molding speed (m/min.) | 300 | | | 350 | 300 | 300 | 300 | 300 |
| Air gap (mm) | 160 | | | 140 | 160 | 160 | 160 | 160 |
| Film thickness (μm) | 20 | | | 20 | 20 | 20 | 20 | 20 |
| Corona treatment | 6 KW | | | 7 KW | 6 KW | | 6 KW | 6 KW |
| Ozone treatment* | Done | | | | | | Done | None |
| Adhesive strength | ⊚ | ⊚ | Δ | ⊚ | ⊚ | X | X | Δ |
| Odor | A | A | A | A | A | A | A | C |
| Fumes | a | a | a | a | a | a | a | c |
| Remarks | | | | | Fillers are contained** | | | |

*Ozone treatment conditions: 50 g/m³ - 4.5 m³/hour
**Fillers: titanium dioxide, Ultramarine Blue, fluorescent brightener

TABLE 2

| | Examples | | Comp. Examples | | |
|---|---|---|---|---|---|
| Items | 6 | 7 | 4 | 5 | 6 |
| Component (A) | LD(I) | | LD(I) | | LD(II) |
| MFR of component (A) (190° C.)(g/10 min.) | 20 | | 20 | | 8.2 |
| Component (B) | 1,2-polybutadiene | | — | 1,2-polybutadiene | — |
| MFR of component (B) (g/10 min.) | 3.0 (150° C.) | | — | 3.0 (150° C.) | — |
| No. of intramolecular unsaturated bonds of (B) (per 1000 carbon atoms) | 250 | | — | 250 | — |

TABLE 2-continued

|  | Examples | | Comp. Examples | | |
|---|---|---|---|---|---|
| Items | 6 | 7 | 4 | 5 | 6 |
| Content of component (B) (%) | 5.0 | 1.0 | 0 | 0.05 | 0 |
| No. of intramolecular unsaturated bonds in composition (per 1000 carbon atoms) | 12.5 | 2.6 | 0 | 0.13 | 0 |
| Substrate | Aluminum foil | | Aluminum foil | | |
| Molding temperature (° C.) | 250 | | 250 | | 320 |
| Molding speed (m/min.) | 150 | | 150 | | 150 |
| Air gap (mm) | 120 | | 120 | | 120 |
| Film thickness ($\mu$m) | 20 | | 20 | | 20 |
| Ozone treatment* | Done | | Done | | None |
| Adhesive strength (g/15 mm) | 360 | 220 | 50 | 50 | 290 |
| Odor | A | A | A | A | C |
| Fumes | a | a | a | a | c |

*Ozone treatment conditions: 50 g/m$^3$ - 4.5 m$^3$/hour

TABLE 3

|  | Examples | | | Comp. Examples | | |
|---|---|---|---|---|---|---|
|  | 8 | 9 | 10 | 7 | 8 | 9 |
| Component (A) | LD(I) | LL/LD | | LD(I) | | LD(II) |
| MFR of component (A) (190° C.)(g/10 min.) | 20 | 10 | | 20 | | 8.2 |
| Component (B) | 1,2-polybutadiene | | | — | 1,2-polybutadiene | — |
| MFR of component (B) (g/10 min.) | 3.0 (150° C.) | | | — | 3.0 (150° C.) | — |
| No. of intramolecular unsaturated bonds of (B) (per 1000 carbon atoms) | 250 | | | — | 250 | — |
| Content of component (B) (%) | 5.0 | 1.0 | 5.0 | 0 | 0.05 | 0 |
| No. of intramolecular unsaturated bonds in composition (per 1000 carbon atoms) | 12.5 | 2.6 | 12.5 | 0 | 0.13 | 0 |
| Substrate | Nylon film | | | Nylon film | | |
| Molding temperature (° C.) | 270 | | | 270 | | 320 |
| Molding speed (m/min.) | 150 | | | 150 | | 150 |
| Air gap (mm) | 120 | | | 120 | | 120 |
| Film thickness ($\mu$m) | 20 | | | 20 | | 20 |
| Corona treatment | 6 KW | | | 6 KW | | 6 KW |
| Ozone treatment* | Done | | | Done | | None |
| Adhesive strength (g/15 mm) | 850 | 490 | 800 | 210 | 200 | 220 |
| Odor | A | A | A | A | A | C |
| Fumes | a | a | a | a | a | c |

*Ozone treatment conditions: 50 g/m$^3$ - 4.5 m$^3$/hour

[Evaluation results]

The following facts are apparent from the above results.

1) Comparative Examples 1, 4 and 7, which do not contain the component (B) and were molded at a molding temperature of 250° C, cause neither odor nor fumes, but are inferior in adhesive strength as compared with the Examples of the present invention.

2) Comparative Examples 2,5 and 8, wherein the amount of the component (B) is too small, cause neither odor nor fumes, but are inferior in adhesive strength, like the above Comparative Examples.

3) In Comparative Examples 3, 6 and 9 in which the molding temperature was increased to 320° C. as usual, odor and fumes are drastically increased, though the adhesive strength is maintained at a level suited for practical use.

Industrial Applicability

The polyethylene resin composition of the present invention is obtained by adding a compound containing a large amount of intramolecular unsaturated bonds, and the laminated member using the polyethylene resin composition can easily maintain high inter-layer strength to different kind of substances, particularly by using the ozone treatment.

In extrusion-lamination molding, high-speed molding at low temperature can be performed while still maintaining a high adhesive strength. Accordingly, productivity can be noticeably improved by increasing the molding speed and, moreover, the influence of fumes on the working and surrounding environments can be inhibited because molding can be performed at low temperature.

What is claimed is:

1. A laminated member comprising a substrate and a layer formed on at least one surface of said substrate, said layer being made of a polyethylene resin composition containing 99.9 to 50% by weight of a polyethylene resin (A) and 0.1 to 50% by weight of a compound having intramolecular unsaturated bonds (B), the number of intramolecular unsaturated bonds in said polyethylene resin composition being not less than 0.5 per 10$^3$ carbon atoms and the number of intramolecular unsaturated bonds in said compound having intramolecular unsaturated bonds (B) is within a range from 0.5 to 250 per 10$^3$ carbon atoms.

2. A laminated member according to claim 1, wherein an inorganic filler and/or an organic filler are incorporated into said polyethylene resin composition.

3. A laminated member according to claim 1, wherein said polyethylene resin is at least one of low-density polyethylene obtained by high-pressure radical polymerization, ethylene·vinyl ester copolymer, copolymer of ethylene·α,β-unsaturated carboxylic acid or its derivative, very low-density polyethylene, linear low-density polyethylene and high-density polyethylene, or a mixture thereof.

4. A laminated member according to claim 1, wherein said polyethylene resin is a low-density polyethylene obtained by high-pressure radical polymerization, having a density within a range from 0.91 to 0.94 g/cm$^3$ and a melt-flow rate within a range from 0.1 to 100 g/10 minutes.

5. A laminated member according to claim 1, wherein said compound having intramolecular unsaturated bonds (B) is at least one selected from polybutadiene, ethylene- α olefin-diene terpolymer and polyisoprene.

6. A laminated member according to claim 1, wherein said compound having intramolecular unsaturated bonds (B) is 1,2-polybutadiene.

7. A method for manufacturing a laminated member, which comprises the step of laminating and adhering a layer on at least one surface of a substrate, said layer being made of a polyethylene resin composition containing a polyethylene resin (A) and a compound having intramolecular unsaturated bonds (B), the number of intramolecular unsaturated bonds in said polyethylene resin composition being not less than 0.5 per 10$^3$ carbon atoms.

8. A method for manufacturing a laminated member according to claim 7, wherein a substrate and/or a film made of a polyethylene resin composition are subjected to a surface treatment and then laminated and adhered through the surface-treated surface by extrusion-lamination method without using an anchor-coating agent.

9. A method for manufacturing a laminated member according to claim 8, wherein a film made of a polyethylene resin composition subjected to an ozone treatment and a substrate subjected to a corona discharge treatment are laminated and adhered through the surface-treated surface.

10. A method for manufacturing a laminated member according to claim 9, wherein at least one surface of a melt film made of a polyethylene resin composition is subjected to an ozone treatment while maintaining the temperature of said melt film within a range from the melting point to 300° C. during the extrusion-lamination process and, immediately after subjecting a substrate to a corona discharge treatment, both are laminated and adhered through the surface-treated surface of said melt film and said substrate.

11. A method for manufacturing a laminated member according to claim 9, wherein the amount of the ozone treatment is within a range from 5 to 1000 g/hour.

12. A method for manufacturing a laminated member according to claim 9, wherein the amount of the corona discharge treatment is within a range from 1 to 300 W·minute/m$^2$.

13. A method for manufacturing a laminated member according to claim 8, wherein lamination is performed at a molding temperature within a range from 200 to 300° C. in the extrusion-lamination process.

\* \* \* \* \*